US012558851B2

(12) United States Patent
Roussel-Garcia et al.

(10) Patent No.: US 12,558,851 B2
(45) Date of Patent: Feb. 24, 2026

(54) DEVICE AND METHOD FOR PRODUCING A GATHERED MATERIAL

(71) Applicant: HERRMANN ULTRASCHALLTECHNIK GMBH & CO. KG, Karlsbad (DE)

(72) Inventors: Raquel Roussel-Garcia, Pforzheim (DE); Robin Alexander Bode, Pforzheim (DE); Timo Zink, Karlsruhe (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 71 days.

(21) Appl. No.: 18/578,356

(22) PCT Filed: Jul. 12, 2022

(86) PCT No.: PCT/EP2022/069435
§ 371 (c)(1),
(2) Date: Jan. 11, 2024

(87) PCT Pub. No.: WO2023/285450
PCT Pub. Date: Jan. 19, 2023

(65) Prior Publication Data
US 2024/0316875 A1     Sep. 26, 2024

(30) Foreign Application Priority Data

Jul. 13, 2021   (DE) ......................... 102021118030.9
Jul. 13, 2021   (DE) ......................... 102021118046.5

(51) Int. Cl.
B29C 65/08        (2006.01)
B29C 65/00        (2006.01)

(52) U.S. Cl.
CPC .......... B29C 65/087 (2013.01); B29C 65/086 (2013.01); B29C 66/006 (2013.01);
(Continued)

(58) Field of Classification Search
None
See application file for complete search history.

(56) References Cited

U.S. PATENT DOCUMENTS 12,134,233 B2 * 11/2024 Weiler .............. B29C 66/81422
2018/0140473 A1   5/2018 Koshijima et al.

FOREIGN PATENT DOCUMENTS

DE      102019124006 A1     3/2021
JP        2019030441 A       2/2019
(Continued)

OTHER PUBLICATIONS

WO 2008/041639 machine translation (Year: 2008).*

*Primary Examiner* — Barbara J Musser
(74) *Attorney, Agent, or Firm* — Hudak, Shunk & Farine Co. LPA

(57) ABSTRACT

An apparatus for producing a gatherable material, wherein the material consists of at least two material web sections and one thread positioned between the material web sections, wherein the apparatus has a tool with a sealing surface and a counter-tool with a counter-sealing surface, wherein the tool and the counter-tool are arranged relative to one another such that the material web sections and the thread are guided through a gap formed by the tool and counter-tool, wherein the tool and/or the counter-tool has a groove for receiving the thread, wherein the groove is orientated in a feed direction divides the sealing or counter-sealing surface into partial sealing surfaces, and has a groove base and two side walls, wherein the side walls connect the groove base to the partial sealing surfaces, and at least one of the partial sealing surfaces has a flank which slopes down towards the groove base.

18 Claims, 4 Drawing Sheets

(52) U.S. Cl.
CPC ........ *B29C 66/1122* (2013.01); *B29C 66/344*
(2013.01); *B29C 66/433* (2013.01); *B29C*
*66/73921* (2013.01); *B29C 66/81435*
(2013.01); *B29C 66/83411* (2013.01); *B29K*
*2995/0046* (2013.01)

(56)                  References Cited

FOREIGN PATENT DOCUMENTS

| | | | | |
|---|---|---|---|---|
| WO | 2008041639 | A1 | 4/2008 | |
| WO | 2018118431 | A1 | 6/2018 | |
| WO | WO-2021043943 | A1 * | 3/2021 | ........... B29C 65/086 |

* cited by examiner

DEVICE AND METHOD FOR PRODUCING A GATHERED MATERIAL

FIELD OF THE INVENTION

The present invention relates to an apparatus and a method for producing a gathered or gatherable material.

The gathered or gatherable material consists of at least two material web sections and at least one thread positioned between the material web sections. The two material web sections are connected to each other at at least two connecting surfaces by the device or in accordance with the method. The thread is arranged between the material web sections and between the two connecting surfaces, so that the thread is fixed between the material web sections in such a way that there is a positive connection between the thread and the material web sections in a first and a second direction, which is aligned perpendicular to the first direction.

The two material web sections can be realised by two material webs that are connected via the connecting surfaces. However, it is also possible to fold a material web in such a way that a first material web section of the material web lies opposite a second material web section of the same material web and the thread is arranged between the first and second material web sections.

The device also has a tool with a sealing surface and a counter-tool with a counter-sealing surface, the tool and the counter-tool being arranged relative to one another in a processing position in such a way that, in order to produce the gathered or gatherable material in an operation of the device, the material web sections and the thread are fed through a gap formed by the sealing surface and the counter-sealing surface in a feed direction.

Furthermore, the tool and/or the counter-tool has at least one groove for at least partially receiving the at least one thread, wherein the groove is orientated in the feed direction and divides the sealing surface or the counter-sealing surface into partial sealing surfaces. In addition, the groove has a groove base and two side walls adjoining the groove base, the side walls connecting the groove base to the partial sealing surfaces.

BACKGROUND THE INVENTION

Corresponding devices or processes for producing a gathered or gatherable material are known from the prior art. The tool can be, for example, a sonotrode of an ultrasonic processing device or a roller that is thermally heated. The following description is based on an ultrasonic processing method. However, the device according to the invention can also be used for other processes without ultrasound.

In order to process a material with ultrasound, the tool, i.e. the sonotrode of the device, is set into ultrasonic vibration. This results in localised heating of the material located in the gap between the sealing surface and the counter-sealing surface. The localised heating, in turn, causes the different layers of material arranged in the gap to fuse together and thus form a strong bond that cannot be separated non-destructively. In contrast to ultrasonic processing, where the heating occurs in a localised area, a roller that is heated thermally heats the material over a large area. However, the remaining operating principle is similar.

In order to produce a gatherable or gathered material, it is necessary to combine materials with different elasticity with each other in the processing operation. For this purpose, for example, a thread that is significantly more elastic than the material web sections themselves is placed between the two material web sections. During the machining process, the thread is tensioned and clamped between the material web sections in at least two spatial directions by fusing them together.

For this purpose, in processes known from the prior art, only the area of the material web sections in which no thread is arranged is welded together. In other words, only the material web sections are welded together, but not the thread.

If the processed material is now removed from the device and the thread is released, the frictional forces between the yarn and the material web sections cause the material to gather, for example. Alternatively, the material can also be gathered in a subsequent work step and the thread shortened accordingly.

Typically, not just one thread is used in such processing operations, but a large number of threads are arranged between the material web sections. Typical applications for such gathered or gatherable materials can be found, for example, in hygiene articles such as nappies.

In order to position the threads correctly in the material web sections, it is known from the state of the art to guide the threads into grooves arranged on the sealing surface or the counter-sealing surface or both. However, it can happen that individual threads change between the grooves. In this case, it can happen that individual threads remain in the area of a partial sealing surface, i.e. in none of the grooves, resulting in unwanted welding of the threads to the material web sections, which impairs the gathering properties of the material to be produced.

SUMMARY OF THE INVENTION

The present invention is therefore based on the object of providing a device or method for producing a gathered or gatherable material, with which the above-mentioned disadvantages are prevented or reduced.

According to the invention, this task is solved by a device of the above-mentioned type, wherein at least one of the partial sealing surfaces has, in a sectional view perpendicular to the feed direction, at least one flank sloping down towards the bottom of the groove. In other words, the transition between the partial sealing surfaces and the groove is designed in such a way that there are no longer any sharp edges which could make it difficult to change the threads between the grooves or could damage the threads.

In a preferred embodiment, each of the partial sealing surfaces in a sectional view perpendicular to the feed direction has one and preferably two flanks that slope down towards the bottom of the groove. In this case, the sealing surface or the counter-sealing surface no longer has any sharp edges.

The design of the partial sealing surfaces between the grooves according to the invention reduces damage to the thread and thus the probability of thread breakage on the one hand, and makes it easier to position threads in the individual grooves on the other hand. Since the threads slide more easily into the grooves via the flank, it is less frequent for a thread to be positioned in the area of the partial sealing surfaces and the risk of unintentional welding of the threads is reduced.

In a preferred embodiment, the flank is convexly curved in a sectional view perpendicular to the feed direction with a radius $R_F$, whereby the radius $R_F$ is preferably between 0.01 mm and 0.5 mm and particularly preferably between 0.05 mm and 0.2 mm.

The design of the flank as a convex curvature offers the advantage that there are no longer any edges between the partial sealing surface and the side wall of the groove, but the partial sealing surface runs into the side wall of the groove in a uniform curvature. This is particularly effective in preventing damage to the thread.

In a further embodiment, the groove base is concavely curved, with the concavely curved groove base preferably directly adjoining the convexly curved flank of the partial sealing surface.

For the purposes of the present invention, the term convex means that a straight line between any two selectable points of the convexly curved surface extends completely within the tool or counter-tool body. The term concave, on the other hand, means that a straight line between two arbitrarily selectable points of the surface extends completely outside the body.

The concave curvature of the groove base and, in particular, the direct transition of the concave curved groove base into the convex curved flank offers the advantage that the groove of the device according to the invention no longer has any corners or edges in which fibres of the material to be processed could accumulate. This prevents clogging of the grooves, which would result in inadequate thread guidance.

In a further embodiment, the groove base is concavely curved in a sectional view perpendicular to the feed direction with a radius $R_G$, where preferably $5 R_F > R_G > 0.5 R_F$ and particularly preferably $2.5 R_F > R_G > 0.8 R_F$. The radius of curvature $R_G$ of the groove base is selected in relation to the radius of curvature $R_F$ of the flank in such a way that the partial sealing surfaces have a sufficient width, i.e. do not taper to a point. This reduces wear on the partial sealing surfaces.

In a further embodiment, the at least one groove is arranged on the sealing surface of the tool. This offers the advantage that the counter tool can be equipped with a smooth counter-sealing surface, which means that the counter tool can be manufactured very cost-effectively.

In a further embodiment, the counter tool is cylindrical and rotatable about a first cylindrical axis, wherein the counter tool has a lateral surface on which the counter sealing surface is arranged, wherein the first cylindrical axis is orientated such that the feed direction is tangential to the lateral surface. The choice of a cylindrical counter tool offers the advantage that the material to be processed can be moved over the counter tool in the feed direction by rolling over the counter tool. Sharp edges that could damage the material to be processed are thus avoided. In addition, the reduced abrasion produces fewer fibres that could be deposited on the tool parts and thus lead to a reduced service life of the device.

In a further embodiment of the present invention, the sealing surface of the tool is essentially flat in the feed direction. As a result, the force applied by the tool to the material system to be processed can be evenly distributed.

Depending on the material feed, however, it can be advantageous if the sealing surface has a rounded edge in a sectional view parallel to the feed direction, at least in a feed direction from which the material is fed, so that the material to be processed, which runs into the gap at the tool, is also not damaged by sharp edges of the tool. This minimises the tearing of threads, which also results in fewer fibre deposits in the grooves.

In a further embodiment, the groove extends completely over an extension of the sealing surface and/or the counter-sealing surface in the feed direction. This is necessary so that the thread is guided in a particularly stable manner over the entire processing width of the device according to the invention and so that no unintentional processing of the thread by the processing device occurs at any point.

In a further embodiment, the tool is cylindrical, wherein the tool is rotatable about a second cylindrical axis and has a lateral surface on which the sealing surface is arranged, wherein preferably the at least one groove runs in a circle around the lateral surface of the tool. Just as with the cylindrical counter tool, a cylindrical tool offers the advantage that material damage is prevented and the material can roll over the tool.

In a further embodiment, the sealing surface and/or the counter-sealing surface has a plurality of grooves orientated in the feed direction for at least partially receiving the at least one thread, the grooves preferably having a spacing of between 0.1 mm and 10 mm and particularly preferably between 0.4 and 2.5 mm. The distance between two grooves is defined from the centre of one groove to the centre of the immediately adjacent groove.

Several grooves in the sealing surface of the tool or the counter-sealing surfaces allow several threads to be arranged simultaneously between the material webs, which improves the gathering properties of a material. In addition, a uniform gathering over the desired material width can be achieved in this way. The strength of the gathering is determined, among other factors, by the number of threads that exert a force on the material web sections due to their restoring force towards the untensioned state.

In a further embodiment, a plurality of grooves are combined in groove packets, with the grooves of a groove packet preferably having a spacing of between 0.1 and 1 mm, with the groove packets preferably having a spacing of between 5 and 300 mm from one another. The distance of the groove packets is defined from the centre of a groove packet to the centre of the neighbouring groove packet, analogously to the distance between the grooves.

In a further embodiment, the at least one groove has a depth of between 0.05 mm and 0.8 mm. At this depth, threads can be guided with sufficient accuracy and, at the same time, the grooves are comparatively easy to produce from a manufacturing point of view. Deeper grooves could lead to instability of the tool, especially if the distance between the grooves is small, so that only narrow partial sealing surfaces remain, but these are arranged comparatively far away from the groove base. If both the groove base and the flank are curved, the depth of the groove is preferably determined by the sum of the radius of curvature $R_F$ of the flank and the radius of curvature $R_G$ of the groove base.

In a further embodiment, the partial sealing surfaces are convexly curved in a sectional view perpendicular to the feed direction with a radius of curvature $R_T$, wherein preferably the partial sealing surfaces extend into the flanks and preferably $R_F = R_T$. In other words, the partial sealing surface provides a convex curvature, which preferably has a radius of curvature that corresponds to the radius of curvature of the flanks. The partial sealing surfaces therefore no longer have a flat surface, but are curved at every point. In this way, the material webs are only welded linearly in the feed direction. This is particularly effective in preventing unwanted processing of the thread.

In a further embodiment, the tool is a sonotrode of an ultrasonic processing device or a tool that can be thermally heated. Both ultrasonic processing methods and thermal processing methods are well suited for non-detachable joining different layers of thermoplastic materials.

In a preferred variant, the flank adjoins one of the side walls, wherein the flank encloses a first angle with the partial sealing surface which is different from a second angle which the side wall encloses with the partial sealing surface.

The problem underlying the invention is further solved by a method for producing a gathered or gatherable material of the above-mentioned type, the method comprising the following steps:

a) providing at least two material web sections and at least one thread, which is arranged between the material web sections, b) providing a device according to one of the embodiments described above, c) passing the at least two material web sections and the at least one thread through the gap between the sealing surface of the tool and the counter-sealing surface in the feed direction, the thread being guided through the at least one groove of the sealing surface or of the counter-tool while the tool is activated.

The two material web sections are thus welded together on at least two connecting surfaces, with the thread being arranged between the two connecting surfaces in such a way that there is a positive connection between the thread and the material web sections in a first and a second direction, with the two directions being aligned perpendicular to one another.

In other words, the thread can only be moved in the feed direction relative to the material web sections, so that a gathering of the material is achieved.

In the case of a sonotrode, for example, activation of the tool means that it is excited with ultrasonic vibrations. In the case of a thermally heated roller, activation could also mean the infeed movement of the tool.

In a further embodiment of the method according to the invention, a cross-section of the thread is selected during processing in such a way that during step c) not only the two material web sections are welded together, but also an outer section of the thread is welded to the material web sections so that the thread is clamped between the two material web sections. In particular, the outer section of the thread is firmly connected to the two material web sections.

The thread can be firmly connected to the material web sections either by a material bond or by embedding at least one section of the thread or at least one filament of the thread in the material of the material web sections. For example, the material of the material web sections may be melted during welding, a thread section or a thread filament is taken up into the melt, and the melt is then re-solidified. The fixed connection is thus inseparable or can only be released if the material from which the material webs are made is re-heated. Relative movement between the thread and material webs in the direction of the thread is prevented by the fixed connection.

It is essential that the thread in the firmly connected areas can only be moved together with the material web sections. If the thread is under tension during step c. and is released after processing, the material web sections gather together as the thread re-contracts.

In a further embodiment, the fixed connection is made in such a way that, in a sectional view perpendicular to the thread direction, the thread is only firmly connected to the material web sections in regions in the circumferential direction, with the fixed connection preferably being made in such a way that, in a sectional view perpendicular to the thread direction, the thread is firmly connected to the material web sections at two separate regions in the circumferential direction. The thread is therefore not continuously connected to the material web sections in the circumferential direction. It is also not necessary to connect the thread continuously to the material web sections in the longitudinal direction. Instead, in a preferred embodiment, the connection is also only made in regions in the longitudinal direction, i.e. in the direction of the thread.

In this embodiment, the thread is no longer arranged to move freely between the material web sections, but is also fixed to the material web sections in the feed direction. In this way, the position of the thread in the material web sections can be defined particularly precisely. Due to the different elasticities of the materials joined together and the tensioning of the thread during welding, the material is nevertheless gathered. The products created using this process have a high level of accuracy and reproducible quality, as the threads are reliably arranged in a fixed position between the material web sections.

BRIEF DESCRIPTION OF THE DRAWINGS

Further advantages, features and possible applications will become apparent from the following description of an embodiment and the associated figures.

FIG. 3 shows an embodiment of the device according to the invention, which has a sonotrode 1 with a sonotrode sealing surface 2 and a counter tool 14, which is cylindrical in shape and lies opposite the sonotrode sealing surface 2 of the sonotrode 1. The sonotrode 1 and the counter tool 14 form a gap in which the material web sections 11, 12 and the thread 13 are guided in a feed direction.

Figure 1:
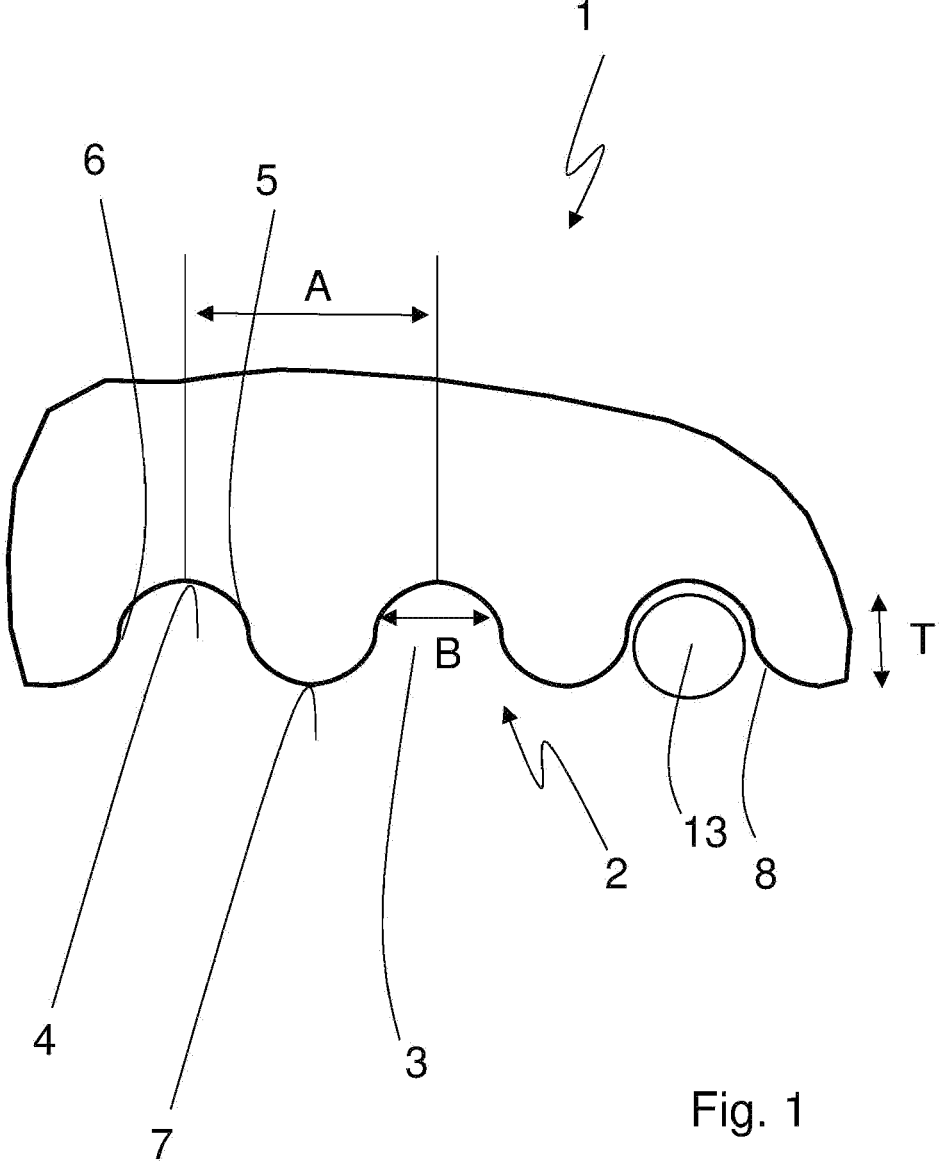
FIG. 1 shows a sectional view of a part of an embodiment of the device according to the invention.

According to the embodiment of the device according to the invention shown in FIG. 1, the grooves 3 for receiving the thread 13 are arranged in the sonotrode sealing surface 2 of a sonotrode 1. The grooves 3 run in the feed direction, which extends into the sheet plane in the sectional view shown in FIG. 1. In addition, the grooves 3 divide the sonotrode sealing surface 2 into several partial sealing surfaces 7.

The grooves 3 have a groove base 4 and two side walls 5, 6 adjoining the groove base, whereby the side walls 5, 6 connect the groove base 4 with the partial sealing surfaces 7.

In the sectional view shown in FIG. 1, the partial sealing surfaces 7 each have two flanks 8 sloping down towards the groove base 4 perpendicular to the feed direction.

The sloping flanks 8 are convexly curved with a radius $R_F$, so that the entire partial sealing surface 7 is convexly curved with a radius $R_T = R_F$. Furthermore, the groove base 4 is also concavely curved with a radius $R_G$ and directly adjoins the convexly curved flanks of the partial sealing surfaces 7. The radius $R_T$ of the curved partial sealing surface 7 corresponds to the radius $R_G$ of the concavely curved groove base 4 and is 0.1 mm.

The grooves also have a width B of 0.22 mm, whereby the width is measured between the two transition points of the concavely curved groove base 4 and the convexly curved flank 8.

In addition, the grooves 3 have a depth T of 0.21 mm. The depth T of the grooves 3 is defined between the deepest point of the groove base 4 and the highest point of the partial sealing surface 7. The distance A between two grooves is 0.42 mm, whereby the distance A is measured at the deepest point of the groove base 4.

To produce a gatherable or gathered material 10, two material webs 11, 12 are arranged between the sonotrode sealing surface 2 of the sonotrode 1 and the counter-sealing surface of a counter tool (not shown), between which a thread 13 is arranged. The thread 13 is guided in such a way that it runs inside the grooves 3. Ultrasonic processing of the material web sections 11, 12 only occurs in the area of the partial sealing surfaces 7.

In methods known from the prior art and also in an embodiment of the method according to the invention, a diameter of the thread 13 in a state in which the thread is tensioned is selected such that it is smaller than a depth of the groove 3. This means that the thread 13 is not processed by the sonotrode 1.

Figure 2A:
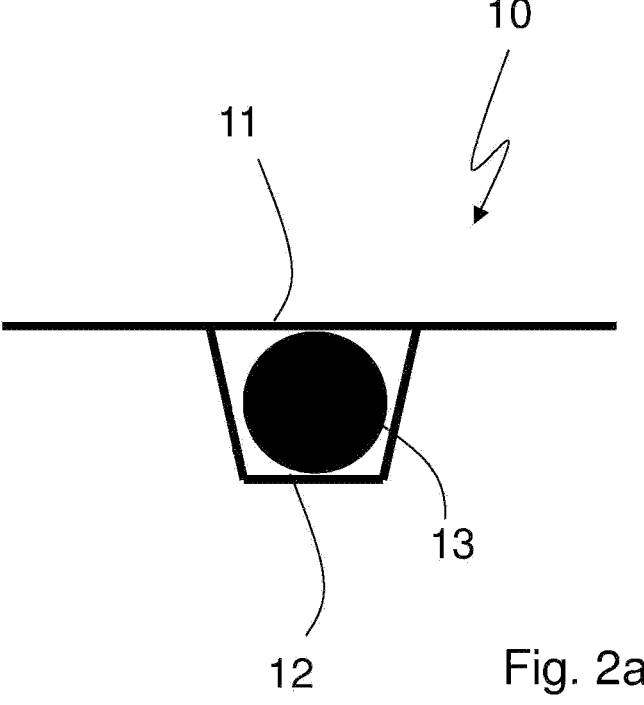
FIG. 2a schematically shows the arrangement of the thread between the material webs after welding using methods known from the prior art.
Figures 4A, 4B, 4C:
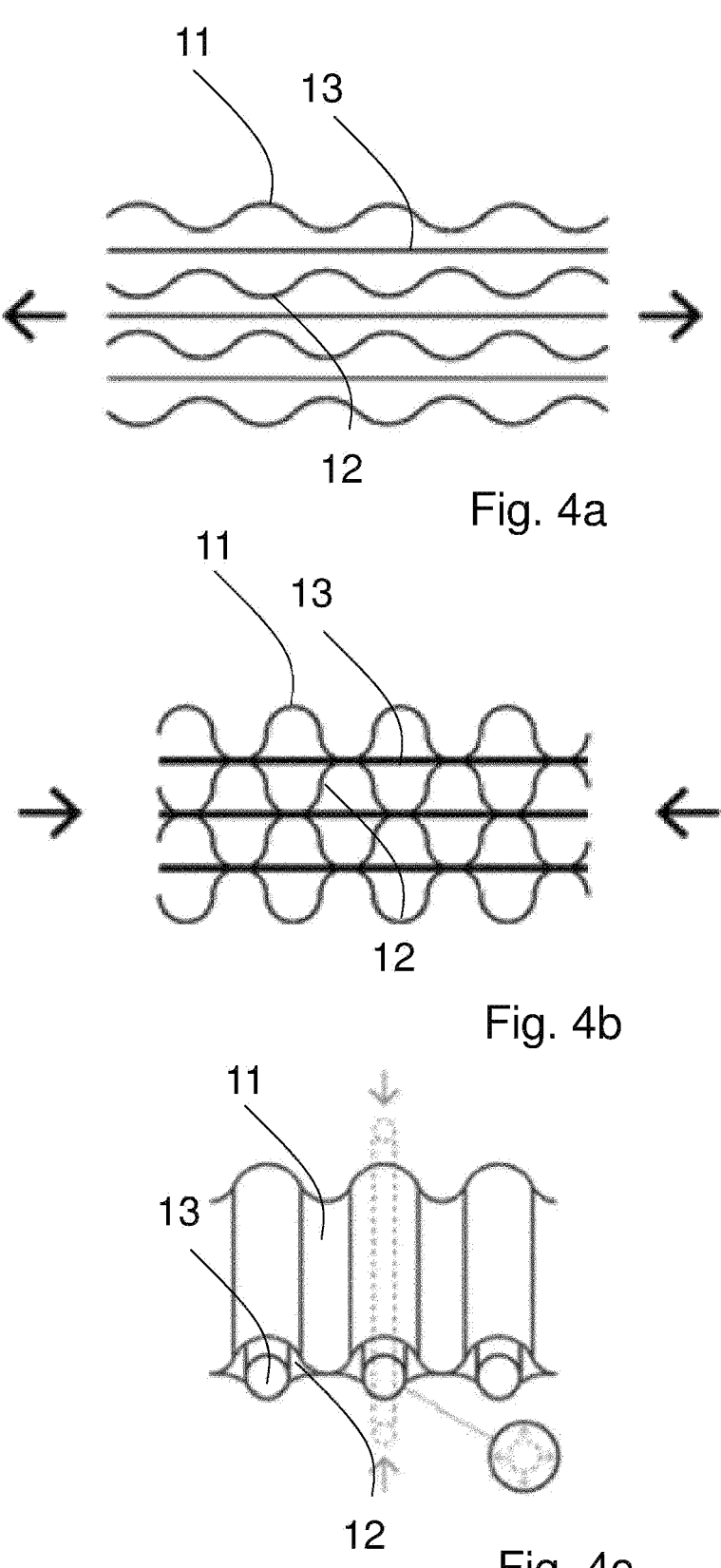
FIG. 4a shows a schematic representation of a longitudinal section of an embodiment of the material according to the invention in the ungathered state.
FIG. 4b shows a schematic representation of a longitudinal section of an embodiment of the material according to the invention in the gathered state.
FIG. 4c shows a schematic representation of a three-dimensional view of an embodiment of the material according to the invention.

The result of such a process with devices known from prior art, i.e. with devices whose grooves have sharp edges, is shown in FIGS. 2a and 4c. The thread 13 is clamped in a cavity between the material web sections 11, 12 of the material 10, but can move in the feed direction relative to the material web sections 11, 12. The lower material web section 12 has the shape of the grooves, which can be arranged on the sonotrode or the counter tool or on both.

Figure 2B:
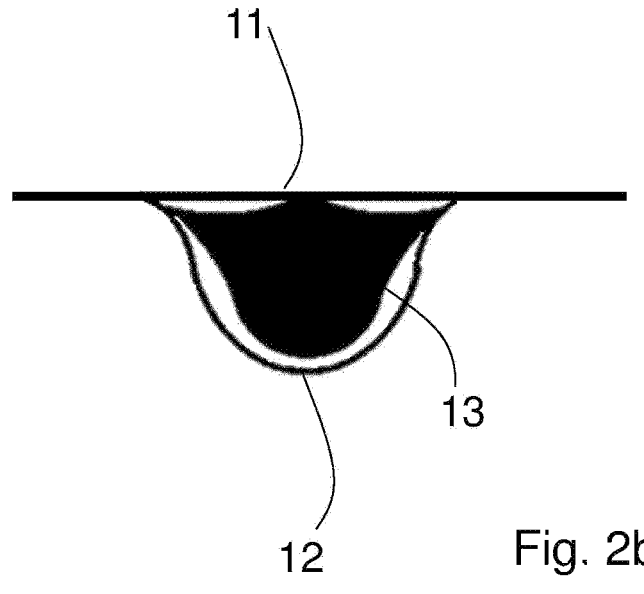
FIG. 2b schematically shows the arrangement of the thread according to an embodiment of the method according to the invention.
Figure 3:
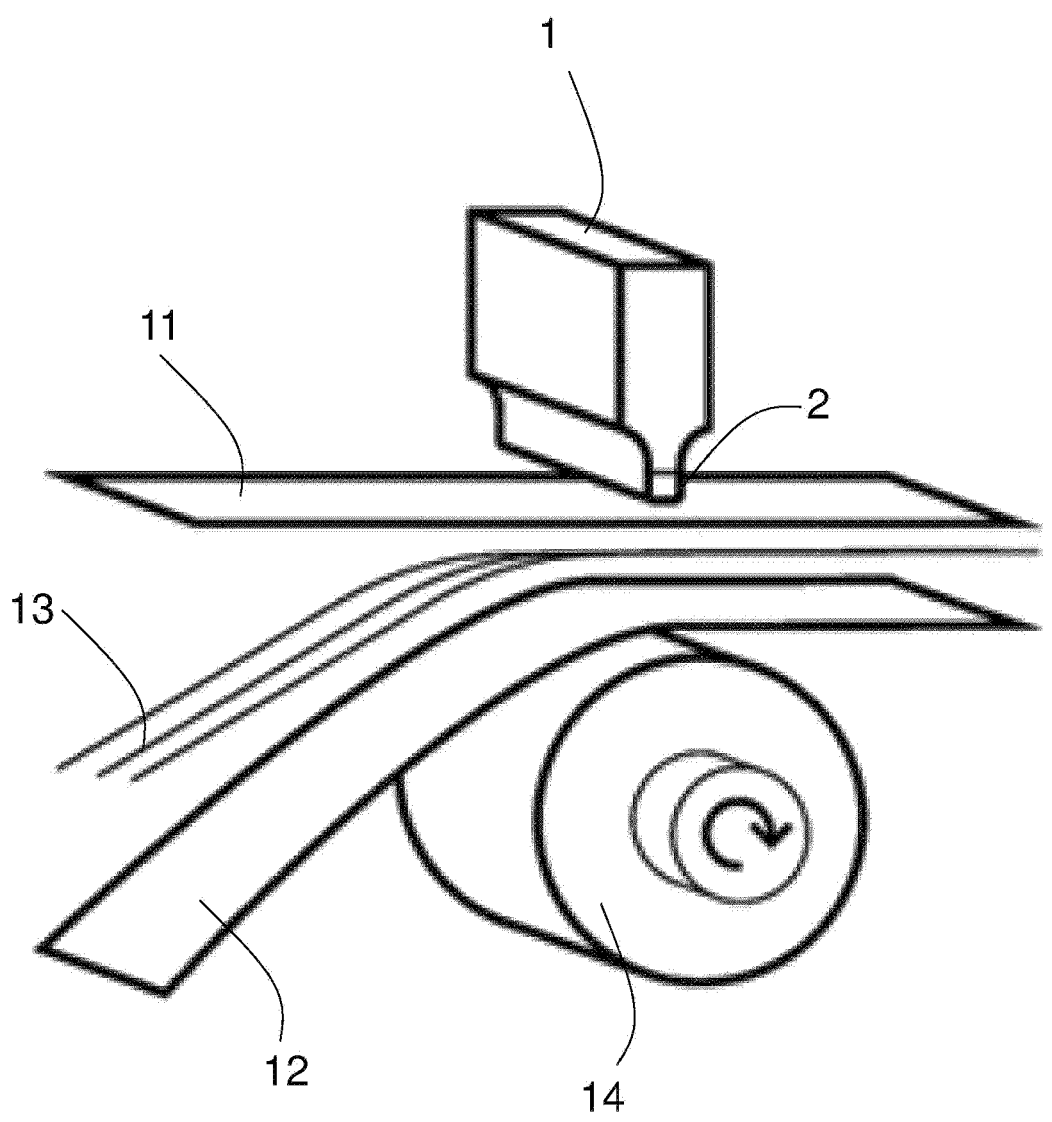
FIG. 3 shows a schematic overall view of an embodiment of the device according to the invention.

In another embodiment of the method according to the invention, the cross-section of the thread 13 is selected so that it is greater than a depth of the groove 3. The result of the method according to the invention is shown in FIG. 2b. By selecting the larger cross-section of the thread 13, the thread 13 is welded in the area of the partial sealing surface 7. As a result, the thread 13 is also attached to the material web sections 11, 12 and can no longer be moved in the feed direction.

In this way, a gathered or gatherable material can be produced, as shown in FIGS. 4a to 4c, whose threads are always arranged in the same position. FIG. 4a shows a longitudinal section along the feed direction, in which the thread 13 is stretched, i.e. the material web sections 11, 12 are not gathered, while FIG. 4b shows the unstretched state of the thread 13, in which the material web sections 11, 12 are gathered in the feed direction.

LIST OF REFERENCE SYMBOLS 1 sonotrode
2 sonotrode sealing surface
3 groove
4 groove ground
5, 6 side walls
7 partial sealing area
8 flank

8

10 gathered or gatherable material
11, 12 material web sections
13 thread
14 counter-tool

What is claimed is:

1. A device for producing a gathered or gatherable material, the material consisting of at least two material web sections and at least one thread positioned between the material web sections, the device comprising:
    a tool with a sealing surface and a counter-tool with a counter-sealing surface, the tool and the counter-tool being arranged relative to one another in a processing position in such a way that for producing the gathered or gatherable material in an operation of the device, the material web sections and the thread are guided through a gap formed by the sealing surface and the counter-sealing surface in a feed direction,
    wherein the tool and/or the counter-tool has at least one groove for at least partially receiving the at least one thread,
    wherein the at least one groove is orientated in the feed direction, wherein the at least one groove divides the sealing surface and the counter-sealing surface, respectively, into partial sealing surfaces,
    wherein the at least one groove has a groove base and two side walls adjoining the groove base,
    wherein the side walls connect the groove base to the partial sealing surfaces, and wherein at least one of the partial sealing surfaces has, in a sectional view perpendicular to the feed direction, at least one flank sloping down towards the groove base,
    wherein the at least one flank is part of or all of the side walls,
    wherein each of the partial sealing surfaces in a sectional view perpendicular to the feed direction has one or two flanks sloping down towards the groove base, and
    wherein the one or two flanks is/are convexly curved in a sectional view perpendicular to the feed direction with a radius $R_F$.

2. The device according to claim 1, wherein the radius $R_F$ being between 0.01 mm and 0.5 mm.

3. The device according to claim 2, wherein the groove base is concavely curved with a radius $R_G$ in a sectional view perpendicular to the feed direction, wherein $5R_F > R_G > 0$, $5R_F$.

4. The device according to claim 2, wherein the partial sealing surfaces including the one or two flanks are convexly curved in a sectional view perpendicular to the feed direction with a radius of curvature $R_T$.

5. The device according to claim 1, wherein the groove base is concavely curved.

6. The device according to claim 1, wherein the at least one groove is arranged on the sealing surface of the tool.

7. The device according to claim 1, wherein the counter-tool is cylindrical and rotatable about a first cylindrical axis, wherein the counter-tool has a lateral surface on which the counter sealing surface is arranged, wherein the first cylindrical axis is orientated such that the feed direction is tangential to the lateral surface.

8. The device according to claim 1, wherein the sealing surface is substantially flat.

9. The device according to claim 1, wherein the at least one groove extends completely over an extension of the sealing surface of the tool and/or of the counter-sealing surface in the feed direction.

10. The device according to claim 1, wherein the tool is cylindrical, wherein the tool is rotatable about a second cylindrical axis and has a lateral surface on which the sealing surface is arranged.

11. The device according to claim 1, wherein the sealing surface and/or the counter-sealing surface has a plurality of grooves orientated in the feed direction for at least partially receiving the at least one thread.

12. The device according to claim 11, wherein a plurality of the grooves are combined in groove packets.

13. The device according to claim 1, wherein the at least one groove has a depth of between 0.05 mm and 0.8 mm.

14. The device according to claim 1, wherein the tool is a sonotrode of an ultrasonic processing device or a tool which is thermally heated.

15. The device according to claim 1, wherein the sealing surface and/or the counter-sealing surface has a plurality of grooves orientated in the feed direction for at least partially receiving the at least one thread.

16. The device according to claim 1, wherein the sealing surface and/or the counter-sealing surface has a plurality of grooves orientated in the feed direction for at least partially receiving the at least one thread, wherein the partial sealing surfaces including the one or two flanks are convexly curved in a sectional view perpendicular to the feed direction with a radius of curvature $R_T$, wherein $R_F = R_T$.

17. A method of producing a gathered or gatherable material, the method comprising the following steps:

a. providing at least two material web sections and at least one thread, which is arranged between the material web sections, b. providing a device according to claim 1, c. passing the at least two material web sections and the at least one thread through the gap between the sealing surface of the tool and the counter-sealing surface in the feed direction, the thread being guided through the at least one groove of the sealing surface and/or of the counter-tool while the tool is activated, so that the two material web sections are welded together at at least two connecting surfaces, the thread being arranged between the two connecting surfaces in such a way that there is a positive connection between the thread and the material web sections in a first and a second direction, the two directions being aligned perpendicular to one another.

18. The method according to claim 17, wherein a cross-section of the thread during processing is selected such that during step c. not only the two material web sections are welded together, but also an outer section of the thread is welded to the material web sections, so that the thread is clamped between the two material web sections.

* * * * *